(12) United States Patent
Milivojevic et al.

(10) Patent No.: US 11,855,558 B2
(45) Date of Patent: Dec. 26, 2023

(54) AC START, SOLAR RUN HYBRID SOLUTION FOR SINGLE PHASE, STARTING CAPACITOR, MOTOR APPLICATIONS WITH SOLAR POWER MEASUREMENT

(71) Applicant: PREMIER ENERGY HOLDINGS, INC., Frederick, CO (US)

(72) Inventors: Nikola Milivojevic, Boulder, CO (US); Yusuf Gurkaynak, Arvada, CO (US)

(73) Assignee: PREMIER ENERGY HOLDINGS, INC., Frederick, CO (US)

( * ) Notice: Subject to any disclaimer, the term of this patent is extended or adjusted under 35 U.S.C. 154(b) by 623 days.

(21) Appl. No.: 17/098,201

(22) Filed: Nov. 13, 2020

(65) Prior Publication Data

US 2021/0099109 A1    Apr. 1, 2021

Related U.S. Application Data

(63) Continuation-in-part of application No. 16/786,533, filed on Feb. 10, 2020, now Pat. No. 10,840,831, which is a continuation-in-part of application No. PCT/US2019/019881, filed on Feb. 27, 2019, and a
(Continued)

(51) Int. Cl.
*H02P 1/42* (2006.01)
*H02P 27/08* (2006.01)
*H02K 27/04* (2006.01)

(52) U.S. Cl.
CPC .............. *H02P 1/426* (2013.01); *H02P 27/08* (2013.01)

(58) Field of Classification Search
CPC . H02K 27/04; H02P 1/44; H02P 25/04; H02P 1/265; H02P 3/18; H02P 4/00

USPC ..... 310/66 R, 68 E, 174, 179–190; 318/785, 318/794
See application file for complete search history.

(56) References Cited

U.S. PATENT DOCUMENTS

| 2,280,971 A | 4/1942 | Packer |
| 3,484,670 A | 12/1969 | Shankwitz |
| 4,012,678 A | 3/1977 | Blaha |

(Continued)

FOREIGN PATENT DOCUMENTS

WO    WO 2017/066307 A1    4/2017

OTHER PUBLICATIONS

European Patent Application No. 19761367.2 Extended Search Report and Written Opinion, dated Oct. 11, 2021, 8 pages.
(Continued)

*Primary Examiner* — Jose A Gonzalez Quinones
(74) *Attorney, Agent, or Firm* — COZEN O'CONNOR

(57) ABSTRACT

An induction-type AC electric motor system has a variable frequency motor (VFD) drive having at least two outputs, the VFD drive coupled to be powered by a solar input and to power the motor with a switching device in a first setting. With the switching device in a second setting, a run winding of the AC electric motor couples to an AC input and a start winding of the AC motor couples through a capacitor and start switch to the AC input. The system is configured to, upon determining motor start, put the contactor in first setting and use the VFD drive to continue running the motor, and, when the AC motor is not rotating, the system is configured to periodically measure available solar power and to start the AC motor if the available solar power exceeds a first threshold power determined sufficient to run the AC motor.

17 Claims, 12 Drawing Sheets

Related U.S. Application Data continuation-in-part of application No. 15/907,035, filed on Feb. 27, 2018, now Pat. No. 10,560,033.

(56) References Cited

U.S. PATENT DOCUMENTS

| | | | |
|---|---|---|---|
| 4,794,288 | A | 12/1988 | Lewus |
| 4,820,964 | A | 4/1989 | Kadah et al. |
| 5,103,154 | A | 4/1992 | Dropps et al. |
| 5,162,718 | A | 11/1992 | Schroeder |
| 5,212,435 | A * | 5/1993 | Dutro ............... H02K 17/08 318/785 |
| 5,247,236 | A | 9/1993 | Schroeder |
| 5,561,357 | A * | 10/1996 | Schroeder ............ H02P 1/44 318/785 |
| 6,320,348 | B1 | 11/2001 | Kadah |
| 7,663,335 | B2 | 2/2010 | Park et al. |
| 8,120,305 | B2 | 2/2012 | Kim |
| 8,373,303 | B1 | 2/2013 | Daniels et al. |
| 9,806,660 | B1 | 10/2017 | Chretien et al. |
| 10,560,033 | B2 | 2/2020 | Milivojevic et al. |
| 2013/0307451 | A1 | 11/2013 | Gurkaynak et al. |
| 2017/0077857 | A1 | 3/2017 | Chretien et al. |
| 2019/0267910 | A1 * | 8/2019 | Milivojevic ............ H02P 1/44 |

OTHER PUBLICATIONS

PCT/US2019/019881 International Search Report and Written Opinion dated May 8, 2019, 8 pages.

U.S. Appl. No. 15/907,035, Notice of Allowance dated Oct. 2, 2019, 8 pages.

U.S. Appl. No. 16/786,533, Notice of Allowance dated Jul. 10, 2020, 8 pages.

Indian Patent Application No. 2019227800 Examination Report dated Oct. 24, 2022, 4 pages.

Indian Patent Application No. 202027038442 Examination Report dated May 9, 2022, 6 pages.

Australian Patent Application No. 2019227800 Examination Report dated Oct. 24, 2022, 4 pages.

* cited by examiner

AC START, SOLAR RUN HYBRID
AC START, SOLAR RUN HYBRID SOLUTION FOR SINGLE PHASE, STARTING CAPACITOR, MOTOR APPLICATIONS WITH SOLAR POWER MEASUREMENT

CROSS-REFERENCE TO RELATED APPLICATIONS

The present applicant is a continuation-in-part of U.S. patent application Ser. No. 16/786,533 Filed: Feb. 10, 2020 which is a continuation-in-part of PCT/US19/19881 filed Feb. 27, 2019 and claims priority to U.S. patent application Ser. No. 15/907,035 filed Feb. 27, 2018 (now U.S. Pat. No. 10,560,033).

BACKGROUND

AC Electric motors are widespread and used in many applications. There are two general groups of AC motors based on the electrical supply: single-phase and three-phase. Single phase motors are typically used in household and small power applications, while three phase motors are mainly used in industrial applications where a three-phase electricity supply is provided.

75% of all AC motors are singe phase motors, compared to 25% of three phase ones, but the power level of single phase motors is typically significantly less than those supplied by three phase electricity. Many single-phase AC motors are induction motors with a starting winding coupled through a starting capacitor and starting relay or switch to assist in producing a rotating magnetic field, thus giving a starting torque so that they may begin rotating when power is applied.

Single-phase AC induction motors with starting capacitors draw enormous power surges when full-voltage, full-frequency, AC power is applied to them; these power surges end soon after the power is applied to the motor as power drawn by the motor drops back to a much lower "run" power requirement. Motor starting power surges may reach eight or more times run power requirements. These motor starting power surges may, and often do, exceed power available from solar photovoltaic panel arrays even if those solar panel arrays are large enough, and solar irradiance sufficient, to sustain run power requirements at the time motor operation is desired.

Most common household motor loads are 3-wire, single phase, induction motors with startup capacitors. Running this kind of motor loads through solar power is an economical, but not always efficient. The problem is the part of the day with low solar irradiance, especially early in the morning and late afternoon. Single phase motors require high inrush startup currents, which is difficult to provide during low irradiance time of the day.

While insolation measurement of solar panels is possible, power availability from solar panels may vary because of partial shading and other effects. Direct measurement of power availability is difficult without coupling a load to the panels or attempting to start a motor.

SUMMARY

We propose using a non-solar AC source such as the electrical grid for starting single phase motor loads, but then once the motor started, quickly switching the motor to be driven from a solar energy source. This apparatus could be used for demand-response as well as peak power shaving purposes, to decrease power consumption from the AC grid, while still having critical single-phase loads operate.

A proposed solar hybrid solution for single phase motors with starting capacitor solves the problem of not having enough solar power for starting a single-phase AC motor but having enough solar power to run the single-phase motors from solar power, with modes for measuring the solar PV power availability to know when there is enough solar power, so that AC grid power can be used to start the system, and solar will take over.

In an embodiment, an induction-type AC electric motor system has a variable frequency motor (VFD) drive having at least two outputs, the VFD drive coupled to be powered by a DC solar input and to power the motor with a switching device in a first setting. With the switching device in a second setting, a run winding of the AC electric motor couples to an AC input and a start winding of the AC motor couples through a capacitor and start switch to the AC input. The system is configured to, upon determining motor start, put the contactor in first setting and use the VFD drive to continue running the motor, and, when the AC motor is not rotating, the system is configured to periodically measure available solar power and to start the AC motor if the available solar power exceeds a first threshold power determined sufficient to run the AC motor.

DETAILED DESCRIPTION OF THE EMBODIMENTS

Figure 1:
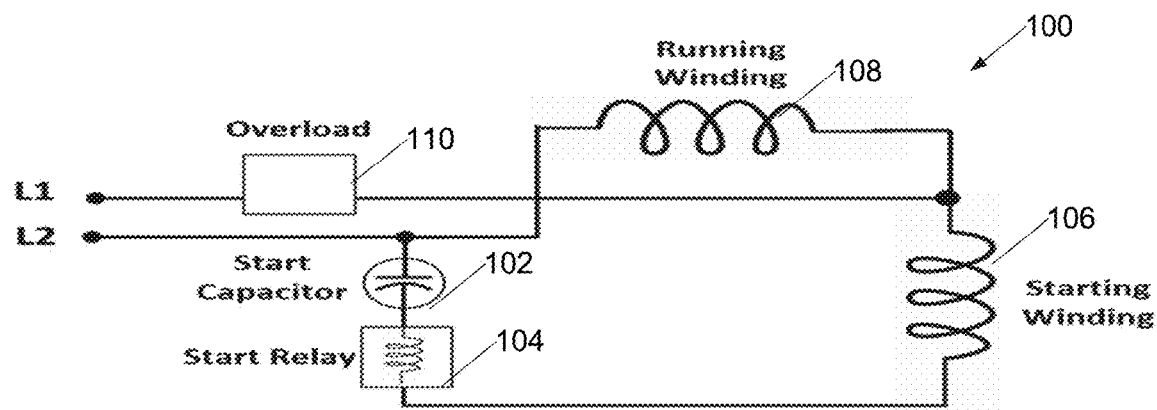
FIG. 1 is a wiring diagram of a single-phase induction motor with starting capacitor and starting relay in a starting winding circuit, a running or main winding in a main circuit, with overload protection common to both circuits.

FIG. 1 illustrates schematically a single-phase induction motor 100 including starting capacitor 102 and starting relay 104 in a starting winding 106 circuit. A running or main winding 108 is in a main circuit, with overload protection as a common block.

Single phase induction motors 100 require a second phase applied to starting winding 106 to induce initial rotation, or start, in addition to power applied to the main winding 108, the starting winding providing a magnetic field phase shifted, in most embodiments about 90 electrical degrees, in respect to the main winding. The starting winding 106 allows the motor to create a starting torque. The phase shift applied to the starting winding is typically achieved with capacitor 102 in series with starting winding 106. Once the motor starts rotating, there is no need for starting winding 106; the starting winding is typically disconnected after rotation begins because it dissipates heat when in the circuit. Switch or starting relay 104 disconnects the starting winding 106 from the circuit once the motor starts. The starting relay 104 can sense current or voltage limits, but the most common type in surface motors is a centrifugal relay that opens when the motor shaft speed reaches around 80% of rated speed. The starting winding 106 with starting capacitor 102 thus drops out of the circuit leaving only the main winding 108 energized, after the motor 100 starts rotating.

The same single-phase motor 148 (FIG. 2) can be run by a three-phase variable frequency drive 150 powered from a solar source 170, if the wire that connects starting winding 153 to start relay 152 is disconnected from start relay 152, and connected directly to a starting phase PH2 154 of the three-phase variable frequency drive 150. That way, starting capacitor and the relay are not in the starting winding circuit anymore. Once the motor has started rotating, the starting phase 154 of the variable frequency drive may drop out of the circuit, leaving the main phase PH3 156 and common return PH1 158 coupled to the main or run winding 160.

Variable frequency drives (VFDs) typically have six power switches (Q1 to Q6), configured as a three-phase inverter. Each switches Q1-Q6 is controlled by microcontroller 162 that generates pulse-width modulated (PWM) signals at a high switching frequency, typically on the order of few to a hundred kilohertz, to generate an approximately sinusoidal current signal on each phase of the motor winding. Such VFDs can be fed directly by a solar power source, but also a voltage boost circuit 164 may be used when input DC voltage Vdc is insufficient for proper VFD operation. Boost circuit 164 has at least one high switching frequency power switch, controlled by a boost control signal generated at microcontroller 162. The boost circuit 164 regulates a DC link 166, 168 voltage that feeds switches Q1-Q6 of the VFD. Microcontroller 162 reads DC link and input solar 170 voltages to generate appropriate duty cycle-boost control signals for controlling boost circuit 164, in turn regulating voltage on DC link 166, 168.

Before connecting to variable frequency drive (VFD), a single-phase motor with start capacitor can be rewired as a three-wire single phase motor, if the wire that connected starting winding to start relay is disconnected from the start relay. Furthermore, if existing running (main) winding is connected to phases: Ph1 and Ph3, and a "starting" winding is connected to Ph2 154, the start capacitor and relay are removed from the starting winding circuit. the running winding voltage (Vr) can be shown as: Vr=Vph3−Vph1, while voltage across starting winding (Vs) is: Vs=Vph2−Vph1.

PWM signals for all six power switches (Q1-Q6) are generated by microcontroller 162 to create voltages Vph1, Vph2 and Vph3. Phases Vr and Vs are generated approximately 90 electrical degrees apart, to create starting torque that starts the motor. Microcontroller 162 can sense the moment motor starts rotating, by monitoring input DC voltage from solar DC source 170.

During start-up, microcontroller 162 generates PWM signals to create PH2 154 and PH1 158 voltages during each attempt to start the motor, as well as return voltage 156. The microcontroller increases the effective voltage and frequency of both motor winding voltages: Vr and Vs according to a V/f motor control algorithm until the generated frequency reaches 30 Hz, half of full speed for typical 60-Hz motors. Once the generated frequency reaches 30 Hz the microcontroller 162 stops generating voltage across the starting winding Vs by not activating power switches Q3 and Q4, and checks the input DC voltage Vdc to determine if motor 148 has started rotating. If the motor has started, the microcontroller continues with a Maximum Power Point algorithm, keeping the voltage/frequency control across the running winding only (Vr). If the microcontroller decided that motor has not started, then it shuts down the PWM signals and tries to start the motor again after a time delay.

Figure 3:
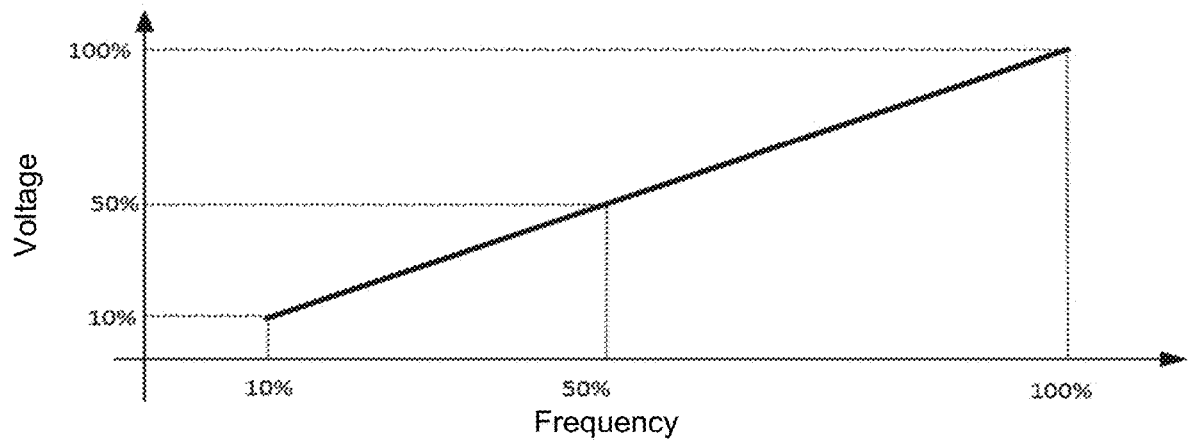
FIG. 3 illustrates a linear voltage versus frequency operating curve for use in controlling the VFD.

Once the motor has started rotating, the VFD continues to generate voltage Vr across the main winding using power switches Q1, Q2, Q5 and Q6, while leaving switches Q3, and Q4 quiescent as the starting winding is no longer used. Microcontroller controls VFD power switches according to frequency/voltage mode illustrated in FIG. 3. By adjusting motor 148's phase voltage and frequency at the same time, the VFD 150 provides variable speed operation of motor 148. Variable speed operation typically uses more power at high speeds than at low speeds, allowing adaption of motor power consumption to power available from the solar power source 170 or to motor's 148 speed requirements.

When VFD 150 is powered by a solar PV source 170, it may use an instantaneous power no greater than that provided by a power limit that varies based on the sun's irradiance (intensity). Therefore, VFD 150 uses variable speed control to balance the input solar power with motor load power. The system obtains as much power as possible from solar source 148 while running the AC motor as a load. Input voltage sensor (Vdc) is used as an input for microcontroller 162, which uses a maximum power point tracking (MPPT) mechanism to obtain maximum power from solar power source 170.

Figure 4:
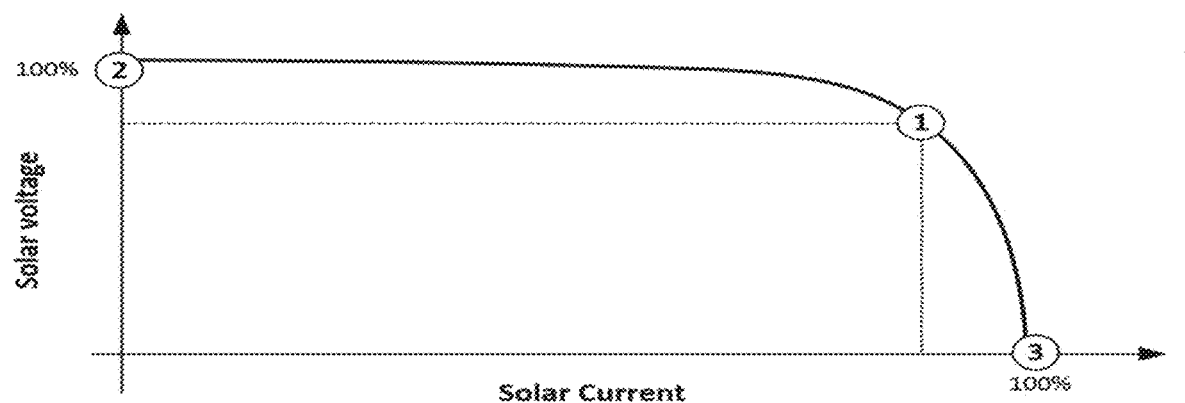
FIG. 4 illustrates a typical voltage current curve of photovoltaic panel output.

MPPT Method:

A typical solar source load curve is illustrated in FIG. 4. The solar source has limited power; power available depends on the panels provided in the solar source, solar irradiance and ambient temperature. FIG. 4 shows solar load characteristic for a given temperature and irradiance.

Point 1 on FIG. 4 shows the operating point of the solar source at which it provides maximum power, known as the maximum power point (MPP). If solar source is unloaded, voltage on the terminals of solar source is maximum, and solar current is zero (point 2), while if solar source is overloaded the current is maximum and solar source voltage drops towards zero (point 3).

An actual solar source operating point can be anywhere between points 2 and 3, but the source provides maximum power if operated at MPP point 1. For some loads, it can be desirable to find the MPP point and operate the solar source at that point.

Microcontroller 162 has machine readable instructions in memory, known herein as MPPT firmware, for finding and tracking an MPP point to operate the solar source at the MPP point according to method 400.

Figure 2:
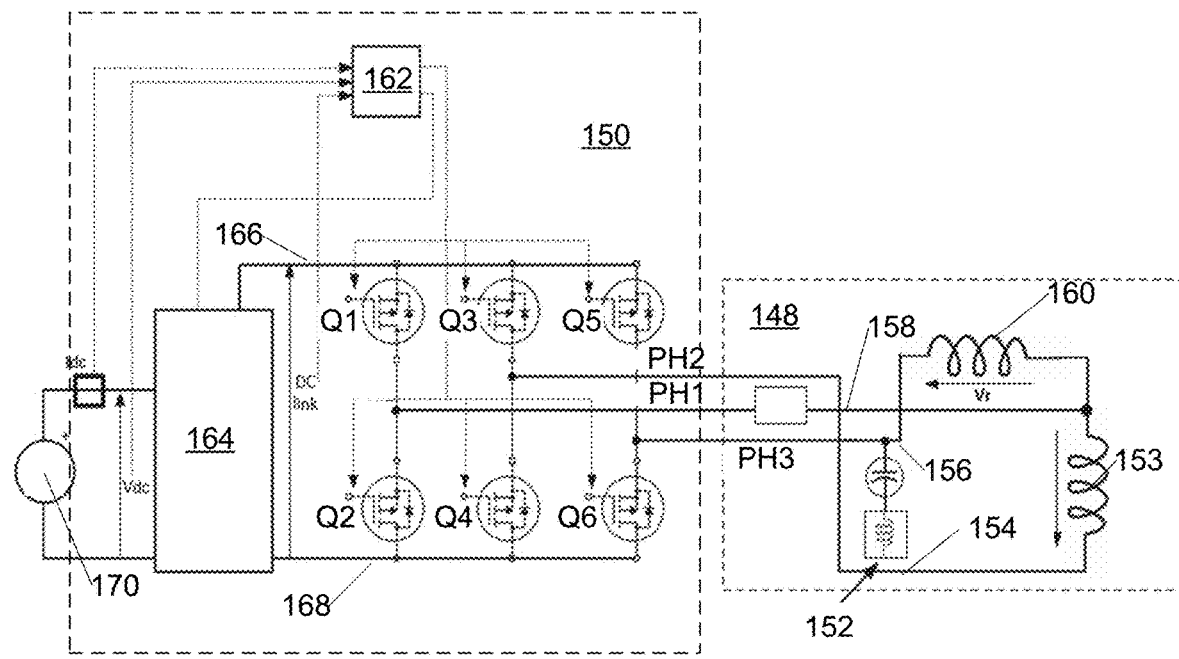
FIG. 2 illustrates schematically a single-phase motor powered by a DC (solar or battery) source and driven by a Variable Frequency Drive (VFD) using the starting winding with a separate phase of the VFD.
Figure 5:
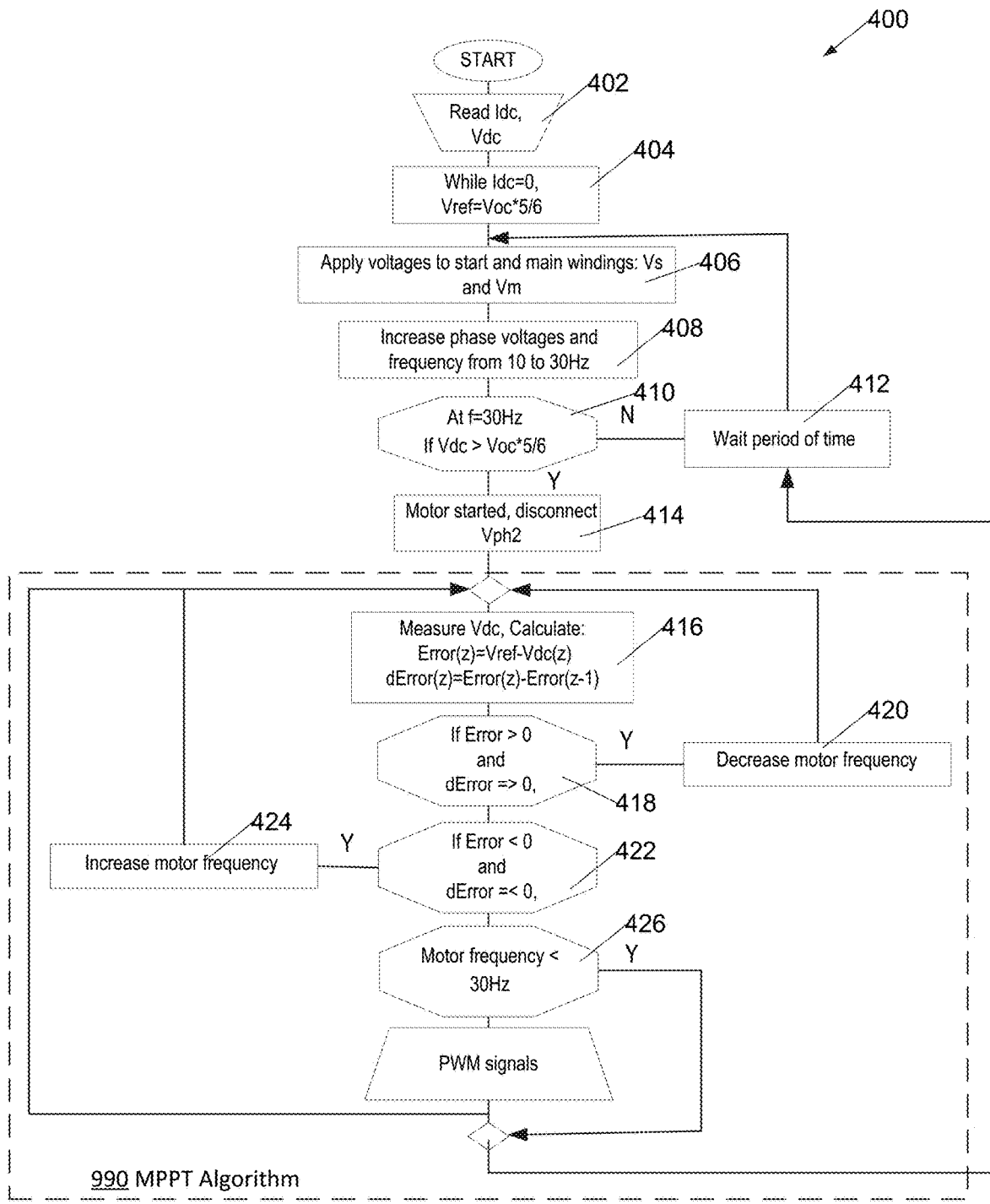
FIG. 5 is a flow chart of a maximum power point tracking algorithm.

With reference to FIG. 2 and FIG. 5, method 400 begins with microcontroller 162 (FIG. 2) measuring 402 voltage (Vdc) and current (Idc) from solar source, it saves a Vdc value for no load condition (Idc=0), an open circuit voltage (Voc) of the solar source 170—determining point 2 of FIG. 4. Microcontroller 162 then initializes 404 a reference voltage value Vref, as Vref=Voc*⅝, as an expected MPP voltage, and it attempts 406 to start the single-phase motor 148 using PWM signals to drive transistor switches Q1, Q2, Q3, Q4, Q5, and Q6. Once the single-phase motor 148 starts rotating, microcontroller 162 increases VFD frequency (and thus motor speed) 408, increasing load on the solar source 170, to move the solar source's operating point from point 2 toward point 1 (FIG. 4).

If panel voltage Vdc drops below Vref before motor 148 reaches 30 Hz, or half-speed, indicating the solar source is producing insufficient power to support low speed operation, microcontroller 162 shuts down the variable speed drive and waits 412 for a timeout period before attempting 406 to start the motor 148 again. If Vdc remains above Vref with the variable speed drive at 30 Hz and the motor rotating, microcontroller 162 shuts down PH2 154 while continuing to operate PH1 158 and PH3 156 to continue operating motor 148.

Once the motor is rotating at half of rated speed with the VFD output at 30 hertz or better, operation of the motor and VFD is according to MPPT method 990.

The MPPT firmware in microcontroller 162 then measures input solar source voltage Vdc and calculates 416 two variables:

Error between reference voltage (initially defined as (Vref=Voc*⅝)) and instantaneous solar input voltage measured at input terminals at all times—Vdc→Error=Vref−Vdc. The error value is positive if instantaneous solar input voltage is lower than reference voltage Vref, meaning that solar source is loaded (higher current) more than the expected MPP point, while the error value is negative if solar source is underloaded with lower current than at the expected MPP point.

Derivative error is a difference in error values defined above for two successive sampling times of the microcontroller→dError=Error(z)−Error(z−1), where Error(z) is error calculated at instantaneous time, while Error(z−1) is error calculated in previous sampling time of the microcontroller. Hence, derivative error (dError) is positive if instantaneous error is higher than error in a previous sampling time, and negative if it's lower than the previous sampling time error.

The microcontroller 162 calculates error and derivate error values repeatedly, to provide near-instantaneous values, comparing them with values from prior sampling times. Depending on instantaneous and previous sampling values of error and derivative error the microcontroller decides whether to increase or decrease operating frequency for VFD 150.

1. If 418 the instantaneous error is positive and derivate error is positive or equal to zero, then microcontroller 162 decreases 420 the reference frequency signal for VFD 150, meaning that instantaneous operating point of the solar powered VFD 150 running single phase motor 148 is loading the solar source beyond MPP point, and should "slow down" in order to get to the MPP point from FIG. 4. If 426 VFD 150 and motor 148 frequency dips below a minimum frequency, such as 30 Hz, microcontroller 162 shuts down VFD 150 and waits 412 for the timeout interval before attempting 406 to start the motor again.
2. If 422 the instantaneous error is negative and derivate error is negative or equal to zero, then microcontroller 162 increases 424 the reference frequency for VFD 150 up to a maximum frequency such as 60 Hz, meaning that instantaneous operating point of the solar powered VFD 150 and motor 148 is below the MPP point, and the motor should "speed up" while drawing more power to get to the MPP point 1 (FIG. 4).

Apart from using error and derivative error for MPPT, the MPPT method also monitors instantaneous absolute value of DC link voltage 166, 168. Boost circuit 164 decouples DC link voltage 166, 168 so the VFD is fed with constant voltage, so that microcontroller can perform MPPT operation and extract maximum power from solar source. However, if boost 164 loses voltage regulation of DC link voltage, DC link voltage will be below referenced value, and microcontroller 162 decreases motor's frequency by an increment; in a particular embodiment the increment is 5 Hz. This unloads the solar source should bring DC link voltage regulation back. However, if stepping back by 5 Hz was not enough, then there will be one or more successive 5 Hz step back steps, until VFD 150 and motor 148's frequency drops below a minimum operating frequency, such as 30 Hz, after which the microcontroller stops VFD operation—FIG. 5. In a particular embodiment the minimum operating frequency is 30 Hz This way, it's possible to run single phase motor using a variable frequency drive powered from solar PV source.

Figure 6:
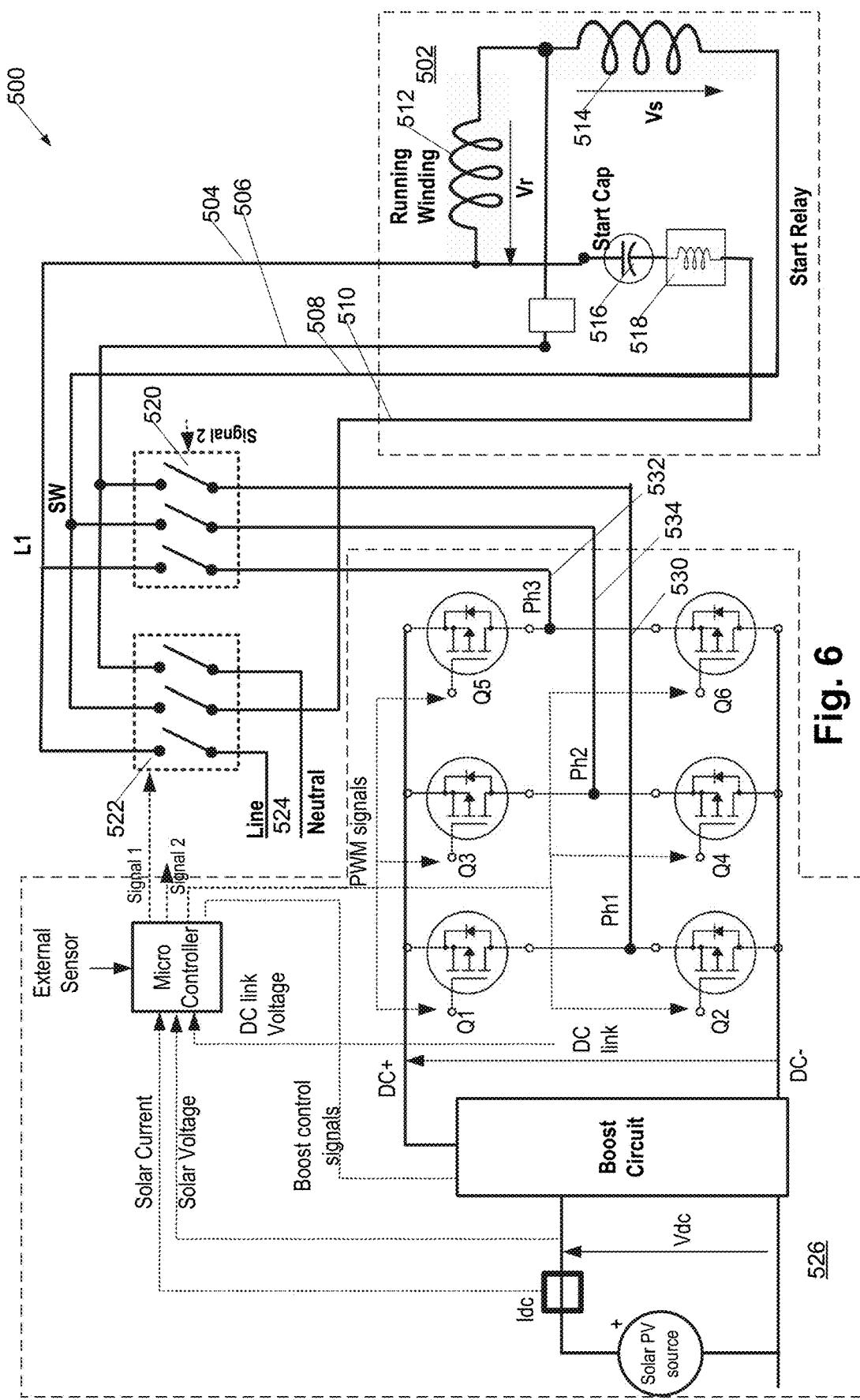
FIG. 6 illustrates a motor with a dual-mode motor-control system supporting variable frequency motor drive when operating on a solar power source and a capacitor start motor drive when operating on an AC line power source.

The motor system 500 of FIG. 6 shows a single-phase motor 502 modified to have 4 leads where: L1 504 and L2 506 are running (main) winding 512, SW 508 and L2 506 drive the starting winding 514 and SR 510 is a starting capacitor 516 and relay 518 lead. Those four leads are connected to the single-phase AC source 524 and three leads from variable frequency drive through separate contactors 520, 522, as shown in the FIG. 6. In an alternative embodiment, a three-pole, double-throw, break-before-make relay replaces both contactors 520, 522.

Main winding leads 504 and 506 are connected to AC line and neutral connections of the AC input 524 respectively through contactor 522, or to PH1 530 and PH3 532 connections of the VFD 526. Starting winding lead SW 508 is connected to starting relay SR lead 504 through contactor 522, or to Ph2 534 of VFD 526 through contactor 520.

Contactors 520, 522 can be energized (actuated) by signals 1 and 2 respectively, but are never energized at the same time. Both contactor control signals can be derived from the microcontroller or some other device with simple signal logic outputs, or manually using a switch.

If the DC source is Solar photovoltaic panels (PV), then the microcontroller or any other logical device may have a solar irradiance (sun intensity) sensor, adapted to sense when solar intensity is below certain redefined threshold, then it can switch contactor 520 OFF (using signal 2) to disconnect solar PV source, and then turn contactor 522 ON (using signal 1), to connect an AC source. A switching sequence is in reverse when the solar intensity sensor recognizes that solar power is available and switches from the AC source 524 back to solar PV source and variable frequency drive VFD 526.

In an alternative embodiment, when operation of the motor is desired, the microcontroller determines whether PV panel voltage Vdc is present, if Vdc is present the microcontroller attempts to start the motor on solar power with contactor 522, 620 off and contactor 520, 624 on. If the motor fails to start, such as when the sun is obscured by cloud, then then the microcontroller switches contactor 520, 624 OFF (using signal 2) to disconnect solar PV source, and then turn contactor 522, 620 ON (using signal 1), to connect an AC source.

During AC line operation, the system of FIG. 6 is effectively configured as a normal capacitor-start induction motor. During solar operation the system of FIG. 6 is effectively configured as an MPPT—VFD 3-phase drive system, with the run winding coupled to PH1 and PH3 and a phase-shifted starting winding coupled to PH2, until rotation begins, when PH2 drops off.

Hybrid system operation can also be achieved if a time relay is used to drive signals 1 and 2 based on the time of the day, so that in the morning the solar source provides power for VFD 526 and motor 502 in 3-wire configuration, while in the evening signal 2 switches the contactors to activate AC source power to directly drive the motor 502 with the starting capacitor 516 in circuit.

An alternative system 600 (FIG. 7) has a dual-mode control system operating a single-phase induction motor 602, the motor run by a two-independent-phases VFD 604 driven by solar power during daylight and a single phase with neutral AC input 606 and starting capacitor 608 at night.

Single phase motor 602 is modified to have 4 leads where: main 610 and a neutral 611 are connected to running (main) winding 612, SW 614 and neutral 611 drive the starting winding 616 and SR 618 is a starting capacitor 608 and relay 621 connection. Those 4 leads are connected to the single-phase AC source 606 and two leads plus neutral from variable frequency drive 604 through separate contactors 622, 624. In an alternative embodiment, a two-pole, double-throw, break-before-make relay (not shown) replaces both contactors 622, 624.

Main winding leads 610 are connected to AC line and neutral connections of the AC input 606 respectively through contactor 620, or to PH1 630 of the VFD 526. Starting winding lead SW 614 is connected to starting relay SR lead 618 through contactor 620, or to Ph2 632 of VFD 604 through contactor 624.

Contactors 622, 624 can be energized (actuated) by signals 1 and 2 respectively, but are never energized at the same time. Both contactor control signals can be derived from the microcontroller or some other device with simple signal logic outputs, or manually using a switch.

Figure 7:
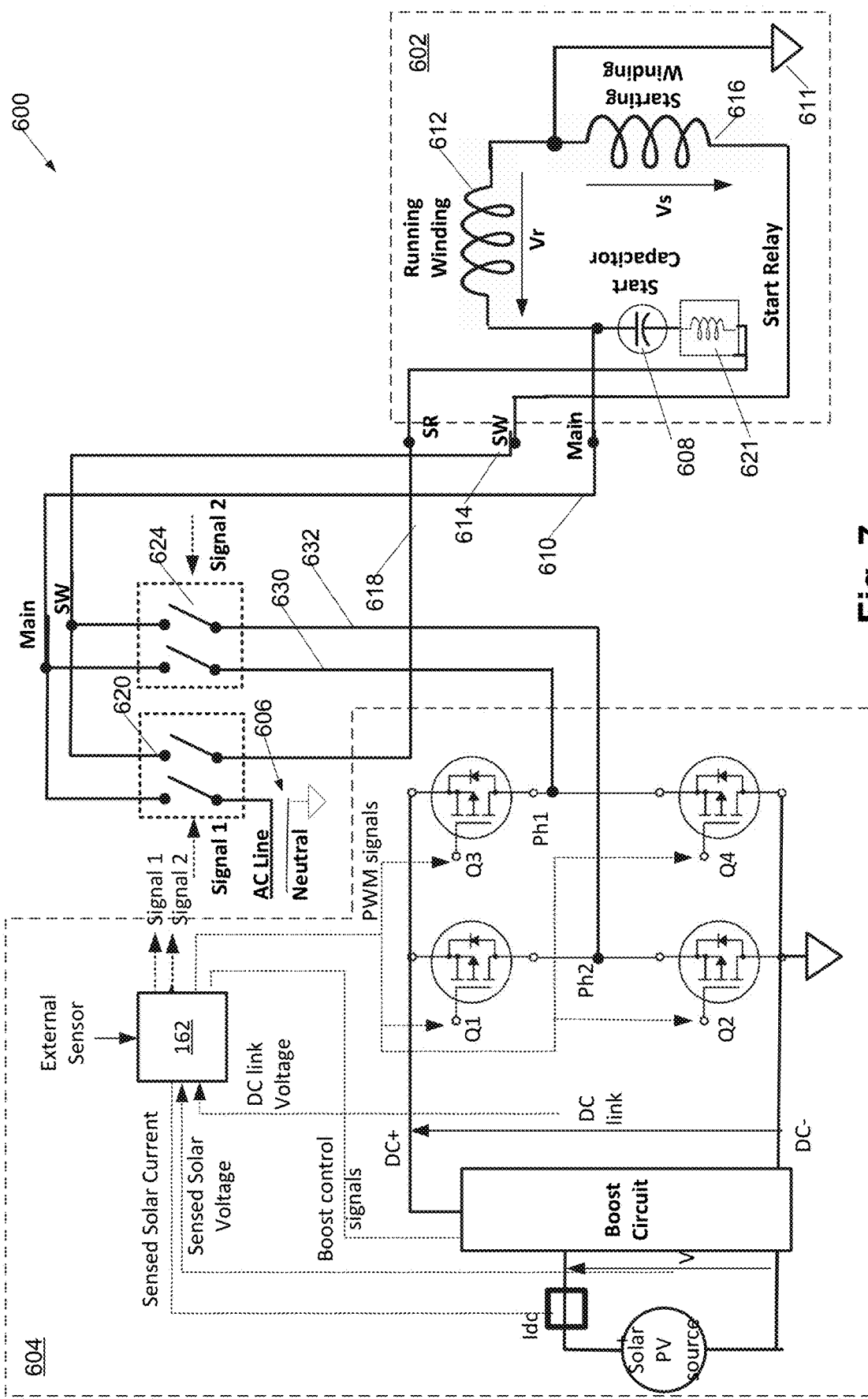
FIG. 7 illustrates a dual-mode control system operating a motor, the motor having a two-independent-phases VFD driven by solar power during daylight and a single phase with neutral AC input and starting capacitor at night.

During AC line operation, the system of FIG. 7 is effectively configured as a normal capacitor-start induction motor driving by line and neutral lines of the AC input 606. During solar operation the system of FIG. 7 is effectively configured as an MPPT—VFD 2-phase drive system, with the run 612 winding coupled to PH1 and a phase-shifted starting winding 616 coupled to PH2 until rotation begins, after which PH2 drops off leaving the starting winding 616 undriven.

In an alternative embodiment 800 (FIG. 8), a power price receiver device 802 is coupled to microcontroller 162 of at least one of two controllers 804, 806 according to FIG. 6 or FIG. 7 to receive rate data indicating periods of high cost electricity. In this embodiment, solar panels 808 provide solar power part, but not all, of each day; a first controller 804 is configured to run a deep well pump motor 810 on solar power if available, and on AC line 812 if sufficient power is available, however controller 804 is configured to run deep well pump motor 810 only if a water level in a cistern 814 is below a threshold as determined by water depth gauge 816 using adjustable thresholds 818.

Cistern 814 serves as a storage device for output of well pump motor 810.

Adjustable thresholds 818 operate with water depth gauge 816 to provide a first, a second, and a third level indication. When water in cistern 814 drops below the first threshold, well pump motor 810 is activated by controller 804 on power from solar panels 808 if available, and on AC line 812 if not, the pump is activated regardless of AC power cost reported by power price receiver 802. This first threshold represents a minimum water level for the cistern requiring filling the cistern at all costs let water run out.

Should water be above the first threshold and below the second threshold, well pump motor 810 is activated by controller 804 on power from solar panels 808 if available, and on AC power only if AC power cost is reported to be low and power from solar panels 808 is unavailable. The second threshold represents a low-reserve level in the cistern, below which the system is authorized to spend on buying cheap AC power.

Should water be above the second threshold but below the third threshold, well pump motor 810 is activated by controller 804 on power from solar panels 808 only if power from solar panels 808 is available; with water above the second but below the third threshold the system is not authorized to spend on buying power for running the pump motor 810 to fill the cistern.

Should water be above the third threshold, all pumping of water ceases to avoid overflowing the cistern.

The second controller 806 is configured to run a boost pump 820 configured to pump water from cistern 814 to pressure tank 822, pressure tank 822 provides water to a building such as a home or business. Pressure tank 822 is fitted with a pressure switch 824 that feeds back to controller 806 to activate boost pump 820 when a water level, and thus pressure, in pressure tank 822 drops below a fourth threshold.

Since boost pump 820 has a higher priority than well pump motor 810, when controller 806 determines from pressure switch 824 that boost pump 820 must run, controller 806 communicates with controller 804 to determine if well pump 810 is operating, if so what power source well pump 810 is drawing from, and reported power cost.

In high-power-cost periods, controller 806 will run boost pump 820 on solar power if solar power is available— shutting down well pump 810 if insufficient power is available for both pumps 810, 820, but enough power is present to run boost pump 820; if no solar power is available then controller 806 runs boost pump 820 on the AC line 812. Well pump 810 is restarted as soon as the boost pump 820 shuts down In low-power-cost periods, controller 806 will run boost pump on solar power if solar power is available and well pump 810 is not running on solar power, otherwise controller 806 will run boost pump 820 on the AC line 812.

When both pumps 810, 820 are not running, and solar power is available, controller 804 instructs grid tie inverter 826 to divert power back into the AC line 812.

Figure 8:
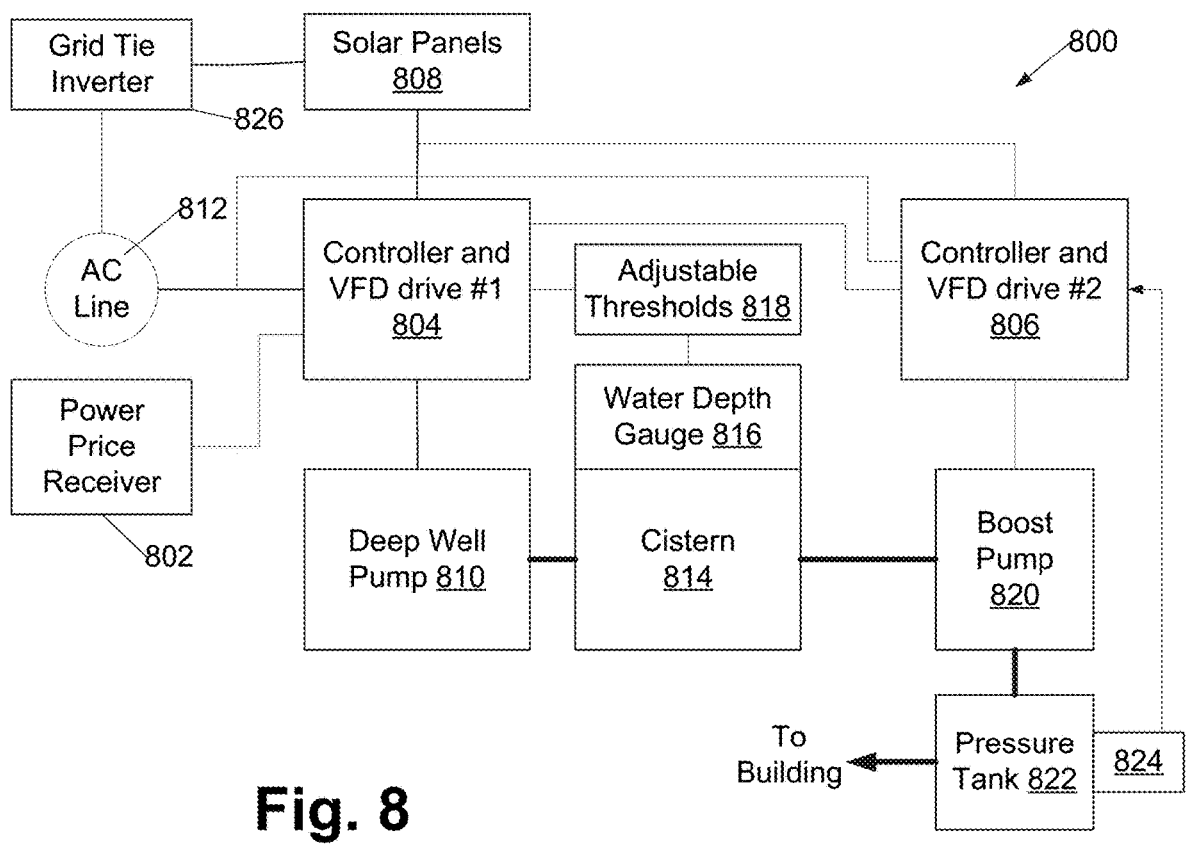
FIG. 8 illustrates an embodiment having a system with two controllers in communication with each other and an electric-rate receiver to optimize cost of pumping in a water system.

The system of FIG. 8 thus optimizes electric power charges for power drawn from AC line 812 by using storage capacity in the cistern. The system runs the well pump 810 when costs are high only if the cistern is nearly empty (below the first threshold), and runs the well pump 810 when costs are low and the cistern is low (below the second threshold) or when solar power is available, coordinating pump operation to avoid overloading the solar panels 808.

Figure 9:
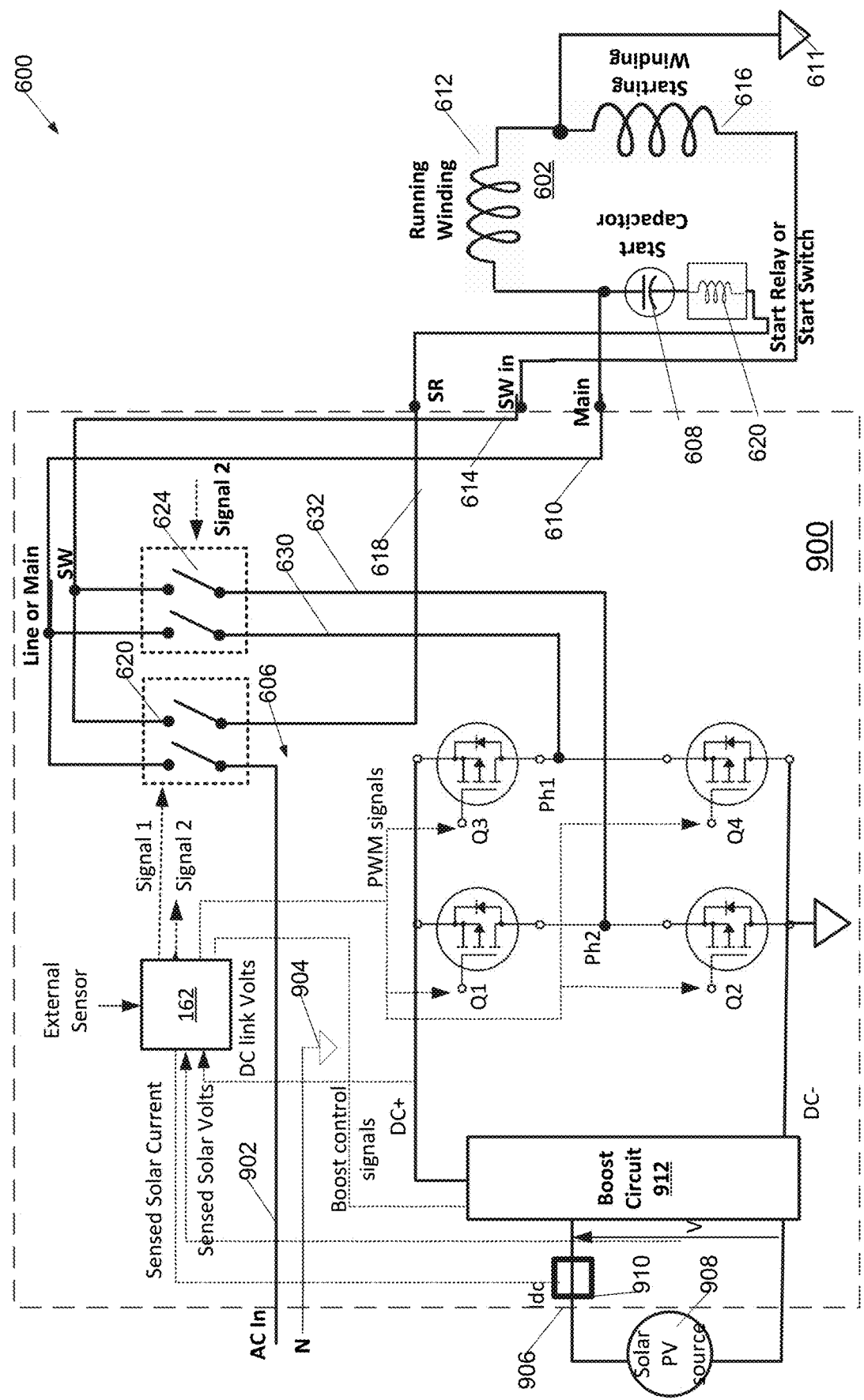
FIG. 9 illustrates components included in a motor controller assembly associated with the system of FIG. 7.

FIG. 9 illustrates components includable in a variable-frequency, MPPT, controller 900 that may be retrofitted to existing capacitor-start AC induction motor 602 to adapt it to perform as for the system 600 illustrated in FIG. 7. For simplicity, components having the same function in FIG. 9 as in FIG. 7 have the same reference number.

At the motor, a connection normally provided between the starting relay or start switch 621 and the starting winding is disconnected, power from the starting relay or start switch 621 is coupled to a starting relay connection SR of controller 900 instead. Controller 900 has a start winding SW output that is wired to the starting winding 616 of motor 602 instead. Controller 900 also has a main winding output Main that is wired to the running winding 612 of the motor 602. The controller has an AC line input 902 and AC neutral input 904 to operate the motor when AC power is available. A direct-current solar-power input 906 is provided to bring power from a solar array 908, where solar current is monitored by a metering circuit 910; solar current and voltage are input to the microcontroller 162 for use by the MPPT firmware.

AC-Start, Solar Run

An alternatives solar hybrid solution for single phase motors with starting capacitors solves the problem insufficient solar power for starting a single-phase AC motor but having enough solar power to run the single-phase motors off of solar differently. Instead of the low-frequency, low-voltage "soft-start" method discussed above with reference to FIG. 5, grid power is used to start the motor and motor operation is switched to solar operation after motor rotation has started.

In an embodiment, a motor control system for induction-type AC electric motors having starting and running windings has a multiphase VFD drive with first and second phase outputs. A switching device that connects the system to the AC source (electrical grid) can be either ON or OFF. The VFD outputs can be turned OFF to avoid driving the grid.

In the ON setting of the switching device the single-phase motor is connected to the AC grid, similar to the way the motor would be connected when powered directly from the AC source. the VFD drive is also connected to the motor, with its outputs disabled. In a particular embodiment, when the switching device is ON the AC source generates a rectified DC link voltage Vdc that powers the VFD device itself, so during the time the single-phase motor is powered from the AC source the VFD is grid powered, enabling its microcontroller to operate. However, while the switching device is ON the VFD does not perform power conversion although its microcontroller observes solar intensity to determine if there is enough solar power to run the single-phase motor, and it can be connected to other devices and receives external signals, like utility signals, and derive decision on when to switch to running the single-phase motor off solar power.

In the OFF setting of the switching device, the single-phase motor is connected to the VFD device output only, and the AC source is disconnected. Hence the motor is from power generated by solar photovoltaic panels through the boost circuit at the input of the VFD.

Figure 10:
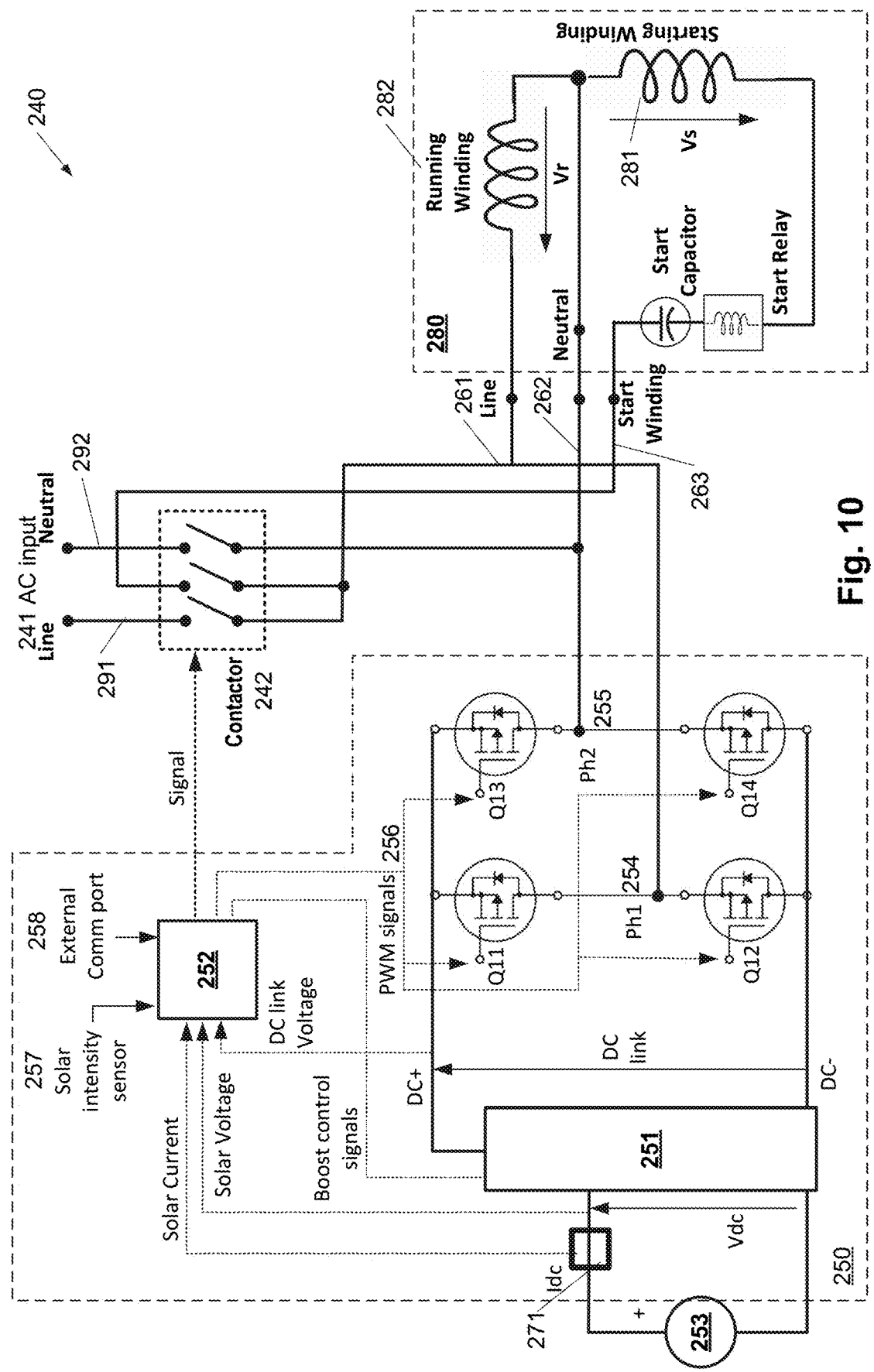
FIG. 10 is a schematic diagram illustrating an alternative embodiment having a motor with a dual-mode motor-control system supporting starting a capacitor start motor on AC line power and configured to switch to using a variable frequency motor drive when solar power is available and it is possible to run the motor on a solar power source.

The motor system 240 of FIG. 10 shows a single-phase motor 280 modified to have 3 leads where: line wire 261 and neutral wire 262 are supplying voltage across the running (or main) winding 282, while start wire 263 and neutral wire 262 provide voltage across the starting winding 281. All three leads 261, 262, 263 are connected to the single-phase AC source 241 and two leads from variable frequency drive 250 through separate switch or contactor 242 as shown in the FIG. 10.

Line 261 and neutral 262 leads are connected to AC line 291 and neutral 292 connections of the AC input 241 respectively through contactor 242, or to PH1 254 and PH2 255 connections of the VFD 250. Start winding lead 263 is connected to the main winding lead 261 through contactor switch 242. In an embodiment, contactor 242 is one or more electronic switching devices. In an alternative embodiment, contactor 242 is an electromechanical relay.

Contactor 242 is operated by microcontroller 252, which in an embodiment is part of the VFD device 250.

If the DC source is solar photovoltaic panels (PV) 253, then the microcontroller 252 or any other logical device may also have a solar irradiance (sun intensity) sensor 257 and/or a voltmeter and ammeter coupled to the photovoltaic panels and adapted to sense when solar intensity is above a pre-defined threshold.

There may be an additional external communication port 258 adapted to receive commands from other devices or systems including a motor operation desired signal and couple these to the microcontroller 252. In some embodiments, the microcontroller receives a utility signal, which can request use of solar energy for running the single-phase motor during high peak power hours, or signals from a demand/response subsystem coupled to or operated by the motor. For example, the microcontroller may receive a high-cost electricity warning signal from utility, and if it decides that there is enough solar power available, the microcontroller switches supplied power for the single-phase motor from AC source to the solar source. In another example, the microcontroller receives "temperature dangerously high" (indicating motor operation is critical) and "cooling desired but not essential" (indicating motor operation is desired but not critical) signals from an HVAC air conditioning or refrigeration system; the microcontroller being configured to start the motor on AC power if either enough solar power is available to run the motor and motor operation is desired but not critical, to start the motor on AC power if motor operation is critical, and to then switch to running the motor on solar power if enough solar power is available.

Boost circuit 251 is a DC-to-DC converter that connects the solar PV source 253 with a VFD device incorporating four high speed power switches: Q11-Q14 driven by the PWM signals 256 from microcontroller 252. In a particular embodiment, boost circuit 251 is an up-converter with a higher output voltage than input voltage.

Microcontroller 252 obtains the solar current information through current sensor 271 and voltage information, as well as DC link voltage information. Once powered, microcontroller 252 decides if there is enough solar power to switch motor operation to solar power only, in which case it turns contactor 242 OFF, and the VFD device takes over running the motor with solar power supplied from the Solar PV source, using solar power conditioned by boost circuit performing the MPPT method 990 described with reference to FIG. 5 to extract maximum power available from the solar PV panels. In this MPPT method 990, when solar power received from the solar panels is insufficient to maintain the DC link voltage at a regulated level determined by the microcontroller, the microcontroller steps down the DC link voltage (and thus the AC voltage provided by the VFD to the motor) and VFD operating frequency by steps of a first size. When solar power received from the solar panels is ample to maintain the DC link voltage at the regulated voltage, the microcontroller may step up the DC link voltage (and thus AC voltage provided by the VFD to the motor) and VFD operating frequency in steps of a second size, steps of the second size being smaller than steps of the first size. The microcontroller remembers the last voltage and frequency tried before the step where it was necessary to step down frequency and voltage and may reset the DC link voltage and VFD operating frequency to that last voltage and frequency for a time before once again increasing DC link voltage and VFD operating frequency.

Figure 11:
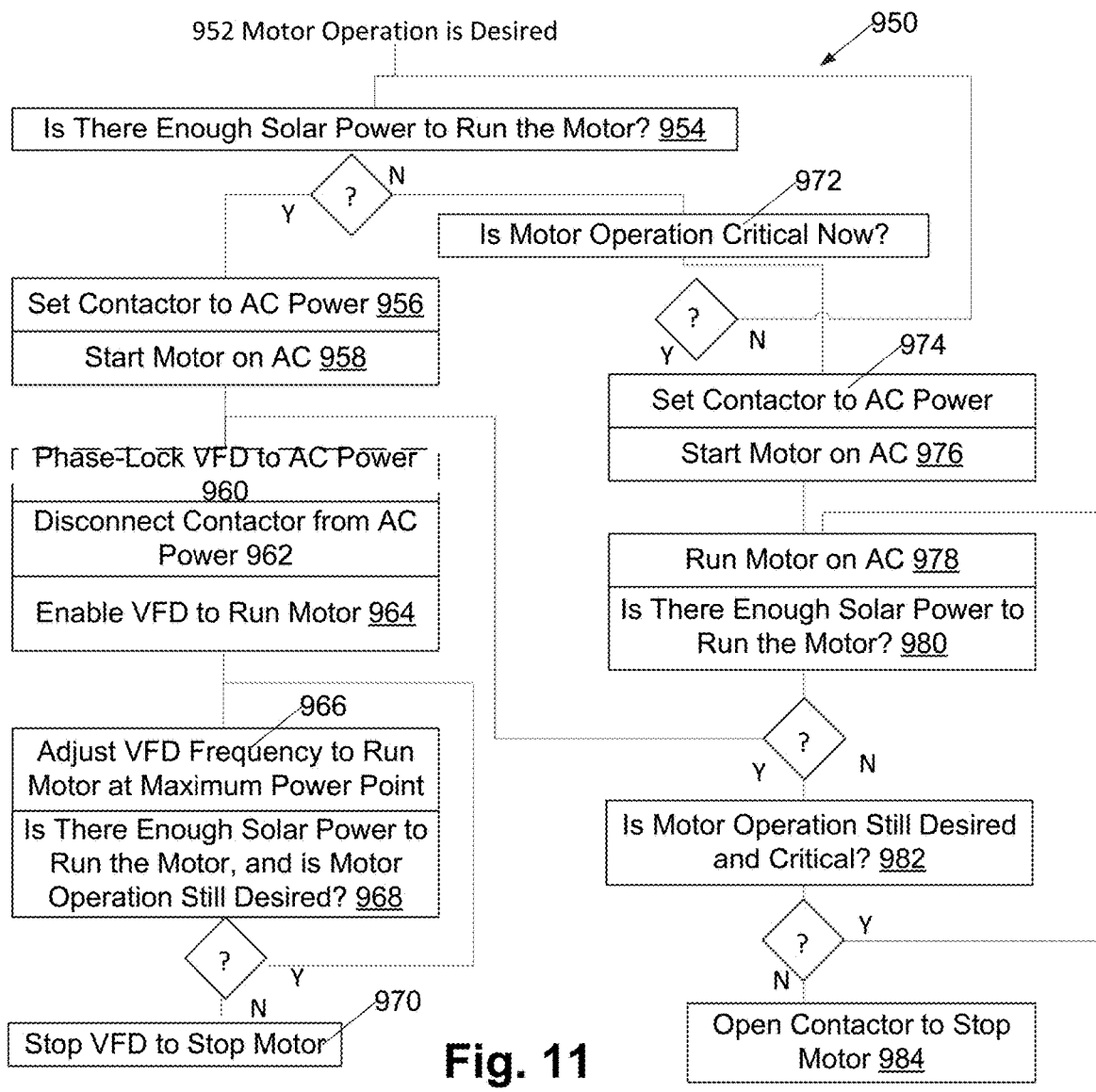
FIG. 11 is a flowchart illustrating operation of the embodiment of FIG. 10.

Operation of the embodiment of FIG. 10 is according the method 950 of FIG. 11, beginning 952 when motor operation is desired. Microcontroller 252 checks 954 the insolation sensor to see if sufficient power is available to run the motor. If sufficient solar power is available to run the motor, the contactor is set 956 to AC power and the motor is started 958; as soon as the motor is started, microcontroller 252 optionally phase-synchronizes 960 the VFD to the AC power, turns contactor 242 off 964, and enables the VFD to power the motor with solar power without stopping the motor.

Figure 12:
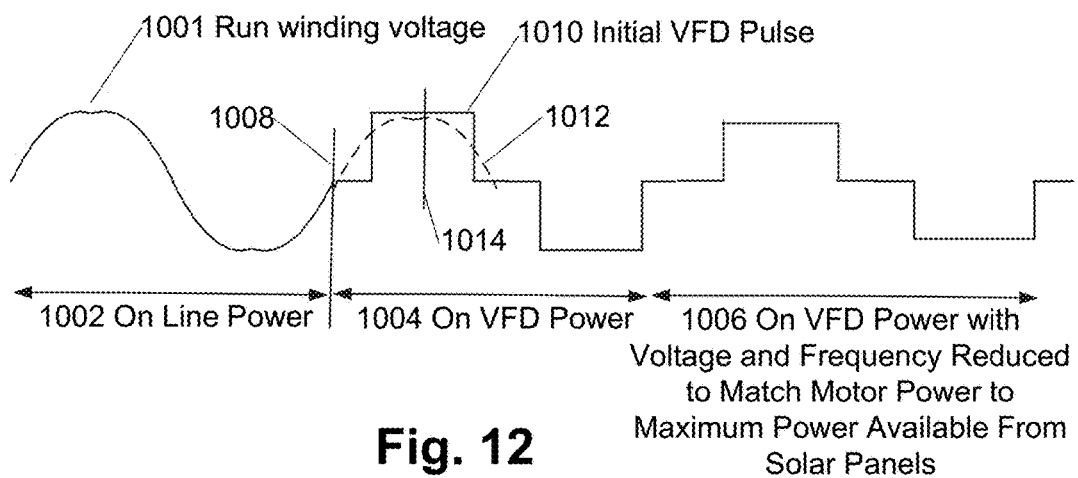
FIG. 12 is a waveform illustrating voltage across the run winding after a motor is started on AC line power as power to the motor switches to the variable frequency motor drive.

Phase-synchronization of VFD to AC power may be understood with reference to FIG. 12 depicting voltage 1001 across the run winding 282 of motor 280. During time 1002 the AC motor is starting on AC power, voltage 1001 across the run winding matches that of AC line power. When the motor has started, as determined by a timeout or by sensing current at motor 280, contactor 242 is opened at time 1008. In a particular embodiment contactor 242 is an electronic switching device and is opened at a zero crossing of current applied to motor 280. Once contactor 242 is opened, the VFD provides an AC voltage, here a pseudosine waveform, during a time 1004, 1006 that the motor runs on solar power provided by the VFD; the first cycle of AC power provided by the VFD includes a pulse 1010 of the same polarity or phase and approximately the same voltage as would have been provided 1012 by the now-disconnected AC power and centered at a time where the next half-cycle of the now-disconnected AC power waveform would have peaked. The VFD does not, however, need to maintain the same operating frequency as the AC power if available solar power is less than that required to run the motor at full speed, in later half cycles during time 1006 the motor may be provided with AC power with voltage and frequency reduced better match power consumed by the motor to available solar power at the maximum power point.

Once the VFD is powering the motor, motor speed and voltage are adjusted 966 as necessary to maintain voltage at the solar panels at the maximum power point if available solar power is less than needed for full speed operation, or at full speed if sufficient solar power is available, using an MPPT method 990. Motor operation continues until operation of the motor is no longer desired or the motor cannot maintain a minimum speed because solar power available has dropped, at which point the VFD is disabled to stop 970 the motor. If the motor was stopped because the motor could not maintain minimum speed on the available solar power, the system waits a predetermined cooling-off time before trying again.

Should insufficient solar power be available to run the motor, microcontroller 252 checks 972 to see if motor operation has become critical, such as when water levels in a reservoir drop below a minimum level or temperatures in a freezer rise to melting. If motor operation is not critical, the system waits. If motor operation is critical, contactor 242 is turned on 976, starting 976 the motor on AC power. Since insufficient power is available, contactor 242 remains on and the motor runs 978 on AC power while the microcontroller 252 periodically checks 980 if sufficient solar power is available to run the motor. If sufficient solar power is now available to run the motor, operation of the motor is switched to solar power by optionally phase-synchronizes 960 the VFD to the AC power, turning contactor 242 off 964, and enabling the VFD to power the motor with solar power. If sufficient solar power is not available to run the motor, microcontroller 252 checks 982 to see if motor operation is critical and desired, and if so continues running 978 the motor on AC power. Once motor operation is not desired or no longer critical, contactor 242 is opened 984 to stop the motor.

In an alternative embodiment without a solar insolation sensor, the microcontroller assumes at a first pass of 954 that sufficient AC power is available to run the motor, starts 958 the motor on AC power, and tries running 964 the motor on solar power. If the motor then stops 970 for want of solar power, the microcontroller checks 972 if motor operation is now critical and restarts the motor and runs it as needed on AC power.

AC Start, Solar Run, with Solar Power Availability Testing

Single phase motor loads can be controlled such that their frequency is changed in a range 50-100% of nominal frequency (50 Hz or 60 Hz) to match motor power to available power. Depending on the motor and what it is driving, the motor power can be linear, square or cube in respect to the AC motor frequency. Power is linearly proportional to the frequency for compressor loads, while cubic relationship of consumed power to frequency is more common for pump and fan motor loads. Thus, power to run the motor load at 50% of its nominal frequency (the power level we've defined as the minimum running power) can be significantly less than half of its nominal power consumption (at 100% of the frequency).

We propose embodiments with four ways of measuring available solar PV power to determine if the system should be started, then, if power is adequate, start the motor on AC grid power before reverting to operation on the available solar power:

One embodiment, illustrated in FIG. 13 with associated text below, uses a power switch at the output of solar panels or input of a solar motor controller to create a short circuit condition over the solar PV panels, such that a microcontroller can measure short circuit current $I_{SC}$. This $I_{SC}$ current is directly proportional to solar irradiance across a panel, hence provides information on solar PV power availability. When this switch is open, the microcontroller measures the open circuit voltage $V_{OC}$ of the solar PV system. Based on short circuit current $I_{SC}$ and open circuit voltage $V_{OC}$, the microcontroller can estimate available power SPA of the solar PV panels, and compares SPA to the pre-measured minimum running power for a motor. This way it's possible to decide when to start the motor from the grid with intent to switch to solar only operation with using solar PV power to run the motor load at or above minimum operational frequency.

Another embodiment, illustrated in FIG. 14 and described below, uses a power switch 1402 in series with a power resistor 1404, connected to the DC positive and negative sides of the DC link circuit. Thus, if this power switch 1402 is ON, the resistor 1404 is directly powered by DC link voltage, across the DC+ and DC− nodes, and if this power switch is OFF, then the resistor is removed from the DC link circuit. In this case power resistor serves as the only load for the solar PV panels 253 because the VFD is temporarily shut off during the measurement. With the power resistor in the circuit, using current sensor 271 and an analog-digital converter input of the microprocessor, we measure solar PV current and voltage respectively, where boost circuit 251 finds a good MDPT operating point over the power resistor 1404. Thus, microcontroller 252 can calculate available solar PV power SPA and determine whether SPA is sufficient to run the motor.

This embodiment need only measure power briefly after which the motor may be started or the resistor is disconnected, allowing use of resistors with heat dissipation ratings significantly below maximum available solar power.

Figure 15:
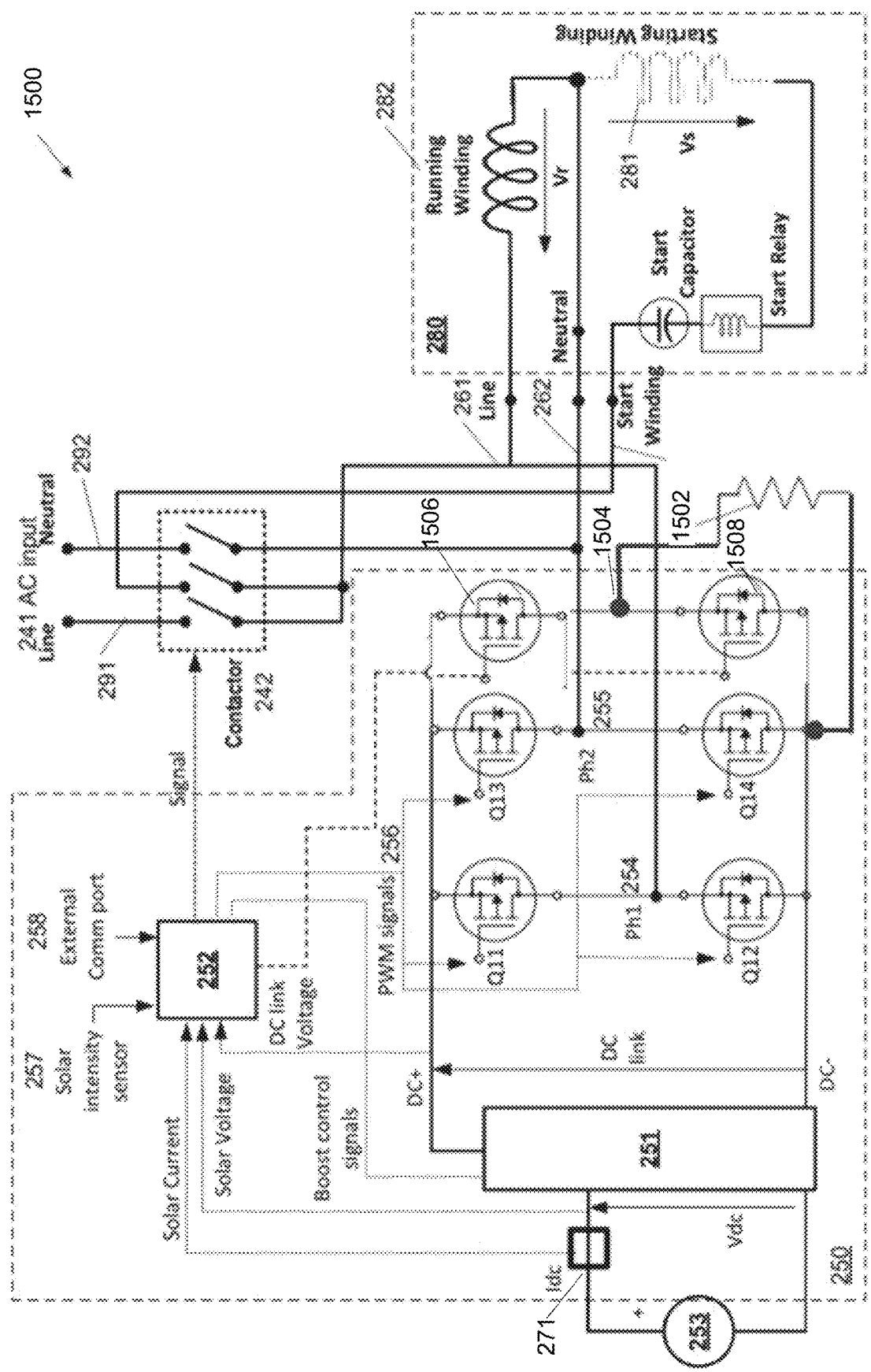
FIG. 15 illustrates an embodiment incorporating a three-phase variable frequency motor drive where the first and second phases are coupled to the motor and the third phase is coupled to a resistor that is driven only while measuring available solar power.

A similar embodiment is shown on FIG. 15, where power resistor 1404 is placed between DC− node of the DC link and output of third phase of a three phase variable frequency drive (VFD). Thus, an off-the shelf VFD output section can be used in this configuration. The VFD acts as power switch 1402 to apply power to the resistor while power is being measured.

A fourth embodiment with hardware as illustrated in FIG. 10 uses the Variable Frequency Drive (VFD) circuit in a buck mode feeding motor phase resistance as a load to the solar PV input circuit without actually starting the motor—motor rotation is inhibited by not driving the start winding. In this embodiment, the solar PV panels are briefly loaded with the motor run-phase winding resistance; to avoid undue heating of the motor, power is only applied to the run-phase winding briefly. Thus, it's possible to measure current and voltage received from the PV panels, and microcontroller 252 can calculate solar PV power SPA a by multiplying current time voltage and determine whether available power SPA from the solar PV panels is sufficient to run the motor.

Once available power has been measured and determined above a first motor-and-load dependent threshold, the system may proceed to apply AC power to the motor's run-phase winding, phase-shifted AC power to the motor's starting winding, and attempts motor starting. If available solar power is above the first threshold, and below a second threshold, the system uses AC power to start the motor, then reverts to powering the motor exclusively from solar power once the motor is started. If motor starting fails or available power is below the first threshold, the system waits for a time and repeats the process of measuring available solar power and attempting startup if the available solar power is sufficient to run the motor.

In some embodiments, the first threshold is a dynamic threshold determined from prior operations of the motor by observing periods of successful motor operation and events where the motor was started but solar power proved insufficient to run the motor; this dynamic threshold is stored in microcontroller memory for future use.

Figure 13:
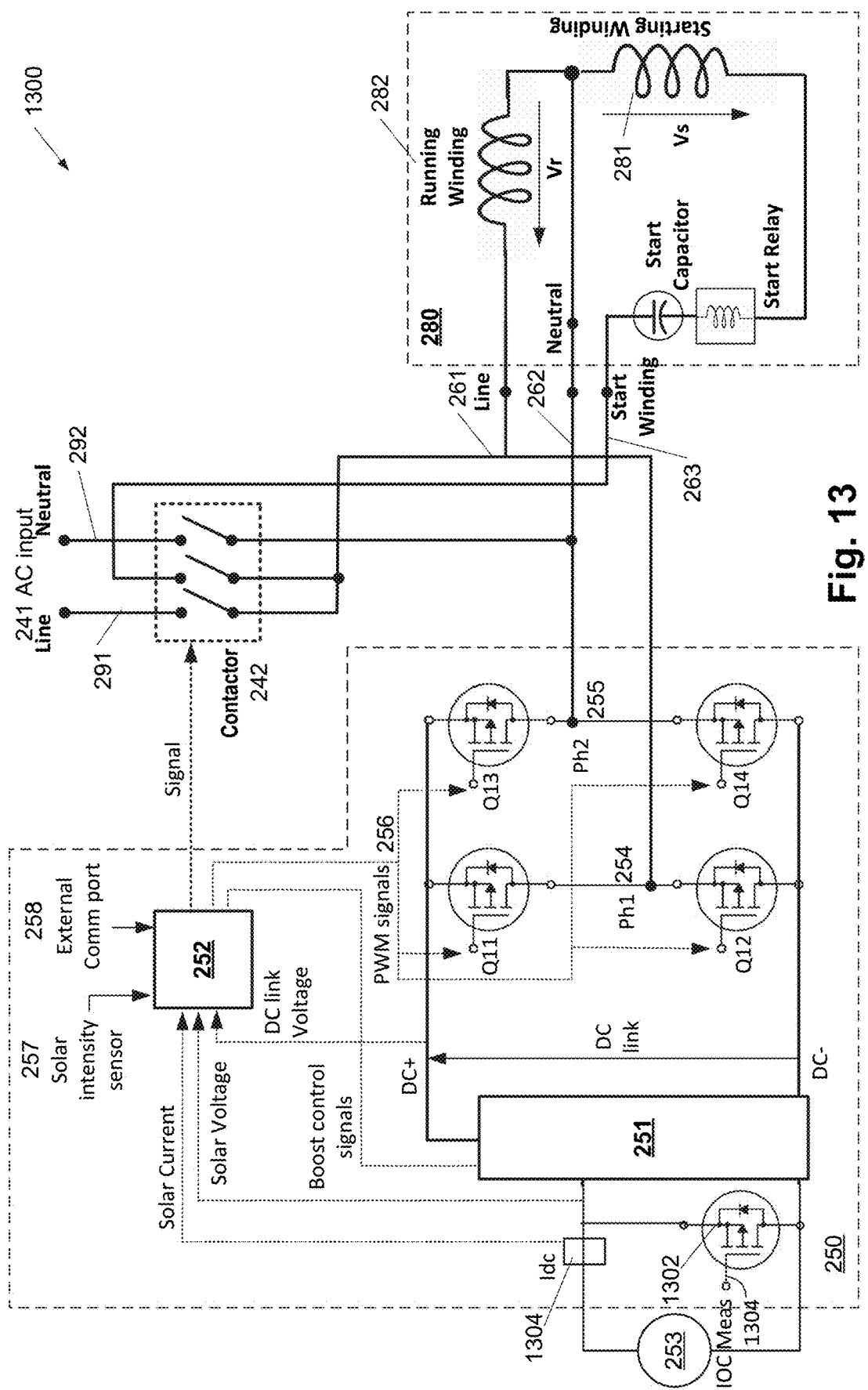
FIG. 13 illustrates a motor with a dual-mode motor-control system resembling that of FIG. 10 supporting a capacitor start motor, that starts the motor on an AC line power source and switches to run on a variable frequency motor drive powered by a solar power source, with added switches on the solar input side for measuring available current (IOC) from the solar PV panels.

The motor system 1300 of FIG. 13 shows a single-phase motor 280 modified to have 3 leads where: line wire 261 and neutral wire 262 are supplying voltage across the running (main) winding 282, while start wire 263 and neutral wire 262 provide voltage across the starting winding 281. Those three leads are connected to the single-phase AC source 241 and two leads from variable frequency drive 250 through separate switch or contactor 242 as shown in FIG. 10.

Line 261 and neutral 262 leads are connected to AC line and neutral connections of the AC input 241 respectively through contactor 242, or to PH1 254 and PH2 255 connections of the VFD 250. Start winding lead 263 is connected to the main winding lead 261 through contactor switch 242.

Contactor switch 242 can be energized (actuated) by signal that can be derived from the microcontroller 252, which is part of the VFD device 250, or some other device with simple signal logic outputs, or manually using a switch.

In this embodiment, if the DC source is Solar photovoltaic panels (PV) 253, then the microcontroller 252 measures available solar PV power by using power switch 1302, which is positioned to short across solar PV panel outputs 253 through current circuit measurement device 1304. Once the switch 1302 is closed by microcontroller signal, and short circuits the solar PV panel(s) then short circuit current $I_{SC}$ of the solar PV panels is measured by current sensor 1304 and provided to the microcontroller. Once the power switch 1302 opens then microcontroller reads the open circuit voltage $V_{OC}$ from the solar PV panels. The microcomputer then multiplies $V_{OC}$ by $I_{SC}$ and compares the product SPA to the first and second thresholds. Thus, it is possible to estimate solar PV power in a real time using current and voltage sensors and power switch, to determine if the available solar PV power would be sufficient to run the single-phase motor load, and thus engage grid power using contactor 242, after which the motor load would start and motor load would be driven by solar PV 253 only using variable frequency drive power switches. There is no need for external solar irradiance sensors.

Figure 14:
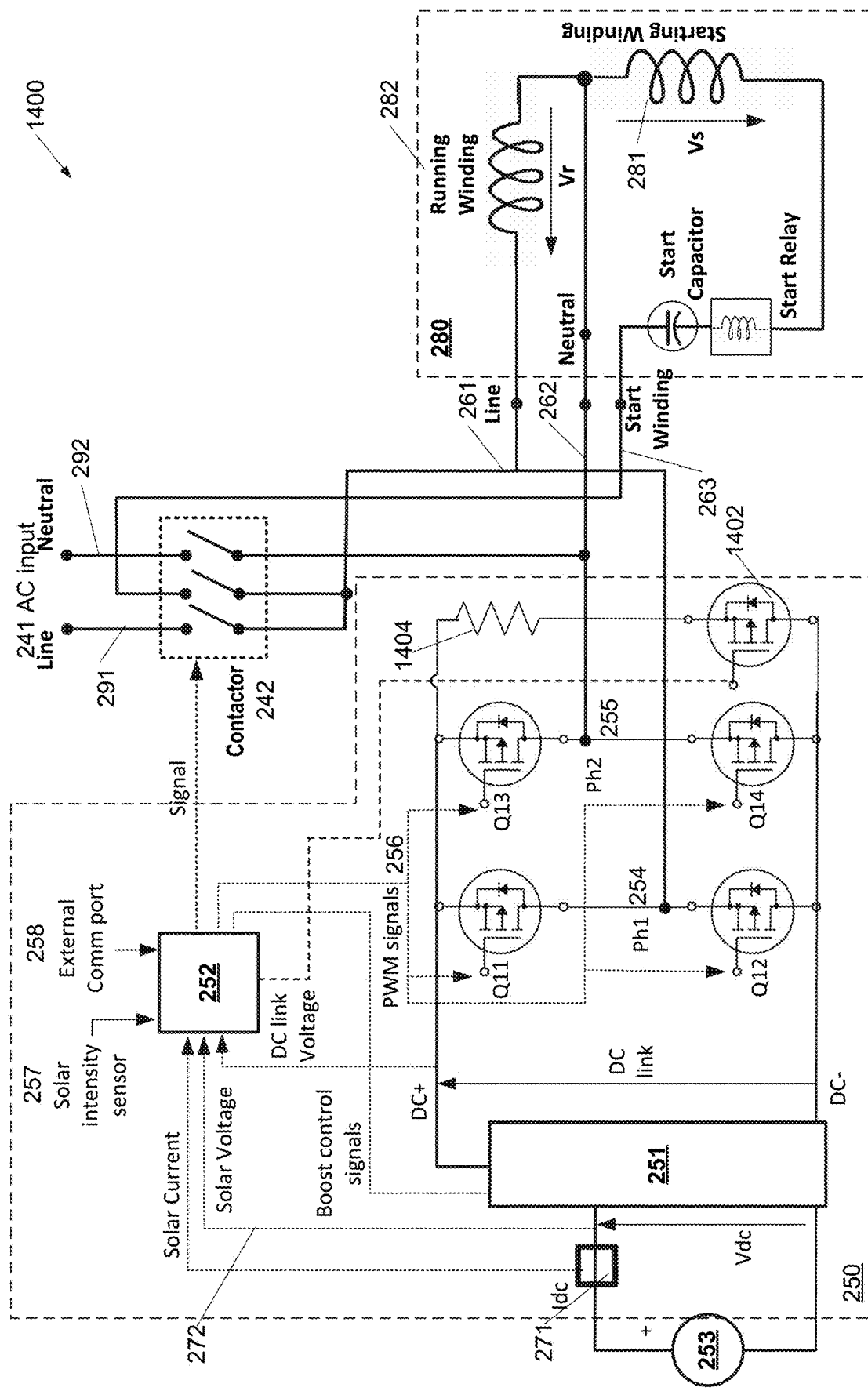
FIG. 14 illustrates a motor with a dual-mode motor-control system resembling that of FIG. 10 supporting a capacitor start motor drive, that starts the motor on an AC line power source and switches to run the motor on a variable frequency motor drive powered by a solar power source, with added switches and an associated resistor bank in the DC link circuit for measuring available power from the solar PV panels.

FIG. 14 shows another embodiment 1400, with power switch 1402 in series with a power resistor 1404 as shown. When power switch 1402 is closed by the microcontroller 252, then power resistor 1404 is connected across the DC link rails DC+ and DC−. In this case, power resistor 1404 serves to load for the solar PV panels 253. Current sensor 271 and voltage sensor 272 are used by microcontroller to measure solar PV current and voltage respectively, where boost circuit 251 is used for performing MPPT operation over the power resistor 1404 in a brief time. Thus, microcontroller 252 can calculate available solar PV power SPA.

If the power switch 1402 is OFF then the power resistor 1404 is not in the DC link circuit at all.

FIG. 15 shows another embodiment 1500, with power resistor 1502 connected to the third phase of a three phase VFD incorporating transistors 1506 and 1508, and a DC− rail of the DC link, as shown. In this embodiment, the first two phases 254, 255, of the VFD couple to run 282 and start 281 windings of the motor, respectively, and the third phase 1504 is configured to selectively apply power to resistor 1502 or bypass resistor 1504.

In a fourth embodiment, solar PV power is measured in real-time, without added power switches or resistors. If boost circuit 251 is optionally bypassed, then solar PV 253 output are directly connected to the DC link rails DC+ and DC−. When contactor 242 is turned OFF, and there is no AC grid input 241, then power switches of the variable frequency drive as controlled by microcontroller 252 signals 256 can apply power to phase connections 254 and 255 of single phase motor 280, such that running winding 282 is positioned across the variable frequency drive output (VFD) phases 254 and 255. Hence, microcontroller 252 can control power switches of the VFD to provide voltage across phases 254 and 255 and thereby use running winding 282 as a load to the solar PV input source 253. Again, current and voltage sensors 271 and 272 respectively are used to measure solar PV 253 available power SPA.

In all four embodiments, once SPA is determined or estimated, SPA is compared to a first threshold $VT_1$ and to a second threshold $VT_2$. If SPA is greater than both $VT_1$ and $VT_2$, the system starts the motor using solar power. If SPA is greater than $VT_1$ but less than $VT_2$, the system starts the motor using power from an external AC source. Once the motor is running, the system continues to run the motor on solar power until motor operation is no longer necessary.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system comprising:
   an AC electric motor of the single-phase induction type;
   the AC electric motor having a start winding, and a run winding;
   an AC input connection;
   a variable frequency motor (VFD) drive having at least a first and a second phase output, the VFD drive coupled to be powered by a solar panel input;
   a contactor having at least a first and a second setting;
   wherein, with the contactor in the first setting, at least one output of the VFD is connected across the run winding of the AC electric motor; and
   with the contactor in the second setting, the run winding of the AC electric motor is coupled to the AC input connection and the start winding of the AC electric motor is coupled through a capacitor and start switch to the AC input connection;
   wherein the system is configured to, upon determining that the motor has started rotating, setting the contactor in the first setting, the variable frequency motor drive thereupon being configured to continue running the motor by applying AC voltage across running winding only, the VFD drive configured to use power from the solar panel input; and
   when the AC electric motor is not rotating, and motor operation is desired, the system is configured to periodically measure an available solar power and to start the AC electric motor if the available solar power is greater than a first threshold power determined to be sufficient to run the AC electric motor.

2. The system of claim 1 wherein the system is configured to measure available solar power by measuring an open-circuit voltage $V_{OC}$ at the solar panel input and a short circuit current $I_{SC}$ at the solar panel input.

3. The system of claim 2 wherein the system is configured to compare the available solar power to a second threshold and, if available solar power is greater than the second threshold, to start the AC electric motor by applying from the VFD drive a first phase AC power to the run winding of the AC electric motor and a second phase AC power to the start winding of the AC electric motor; and, if available solar power is greater than the first threshold and less than the second threshold, to start the AC electric motor by applying power from the AC input connection.

4. The system of claim 3 wherein the first and second thresholds are determined from success or failure of prior attempts to start the AC electric motor.

5. The system of claim 1 wherein the solar panel input is coupled to the VFD drive through a DC to DC voltage converter, and where the system is configured to measure the available solar power by coupling a resistor across an output of the DC to DC voltage converter and measuring voltage at the solar panel input and a current at the solar panel input.

6. The system of claim 5 wherein the system is configured to compare the available solar power to a second threshold and, if available solar power is greater than the second threshold, to start the AC electric motor by applying from the VFD drive a first phase AC power to the run winding of the AC electric motor and a second phase AC power to the start winding of the AC electric motor; and, if available solar power is greater than the first threshold and less than the second threshold, to start the AC electric motor by applying power from the AC input connection.

7. The system of claim 5 wherein the first and second thresholds are determined from success or failure of prior attempts to start the AC electric motor.

8. The apparatus of claim 1 wherein the system is configured to measure the available solar power by placing the contactor is in the second setting, and applying power from the solar panel input through the VFD drive to the run winding of the induction-type AC electric motor while the AC electric motor is not rotating.

9. The system of claim 8 wherein the system is configured to compare the available solar power to a second threshold and, if available solar power is greater than the second threshold, to start the AC electric motor by applying from the VFD drive a first phase AC power to the run winding of the AC electric motor and a second phase AC power to the start winding of the AC electric motor; and, if available solar power is greater than the first threshold and less than the second threshold, to start the AC electric motor by applying power from the AC input connection.

10. The system of claim 9 wherein the first and second thresholds are determined from success or failure of prior attempts to start the AC electric motor.

11. The system of claim 2, the system configured to perform maximum power point tracking.

12. The system of claim 5, the system configured to perform maximum power point tracking.

13. The system of claim 8, the system configured to perform maximum power point tracking.

14. A method of starting and running an AC induction motor using solar power from a solar power input comprising:
   measuring available solar power at the solar power input;
   determining whether the available solar power exceeds a first threshold but does not exceed a second threshold, and if the available solar power exceed the first threshold but does not exceed the second threshold, starting the AC induction motor with power from an AC input, and, once the AC induction motor has started switching to run the AC induction motor with a variable frequency motor drive powered by the solar power input;

determining whether the available solar power exceeds the first threshold and exceeds the second threshold, and if the available solar power exceeds the first threshold and exceeds the second threshold, starting the AC induction motor with power from the variable frequency motor drive powered by the solar power input.

15. The method of claim 14 wherein the available solar power is determined by shorting across the solar power input and measuring a short circuit current and measuring an open circuit solar power input voltage.

16. The method of claim 14 wherein the available solar power is determined by placing a resistive load on a DC-DC converter driven by the solar power input and measuring a voltage at the solar power input.

17. The method of claim 14 wherein the available solar power is determined by applying a voltage through the variable frequency motor drive to a winding of the AC induction motor and measuring a voltage at the solar power input.

* * * * *